(12) United States Patent
Jang et al.

(10) Patent No.: US 7,760,666 B2
(45) Date of Patent: Jul. 20, 2010

(54) METHOD OF GENERATING AND MANAGING CONNECTION IDENTIFIERS FOR SUPPORTING MULTICAST FOR EACH GROUP IN IPV6-BASED WIRELESS NETWORK AND NETWORK INTERFACE USING THE METHOD

(75) Inventors: Hee-Jin Jang, Yongin-si (KR);
Jin-Hyeock Choi, Yongin-si (KR);
Youn-Hee Han, Guri-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 419 days.

(21) Appl. No.: 11/591,600

(22) Filed: Nov. 2, 2006

(65) Prior Publication Data
US 2007/0097971 A1    May 3, 2007

Related U.S. Application Data

(60) Provisional application No. 60/732,647, filed on Nov. 3, 2005.

(30) Foreign Application Priority Data
Jun. 12, 2006    (KR) .................... 10-2006-0052716

(51) Int. Cl.
*H04L 12/28* (2006.01)
*H04L 12/56* (2006.01)
*H04J 15/00* (2006.01)

(52) U.S. Cl. .................. 370/255; 370/312; 370/390

(58) Field of Classification Search ............... 370/254, 370/255, 312, 328, 389, 390, 400, 401, 466
See application file for complete search history.

(56) References Cited

U.S. PATENT DOCUMENTS

| | | | |
|---|---|---|---|
| 5,930,259 A | | 7/1999 | Katsube |
| 5,991,297 A | * | 11/1999 | Palnati et al. ............... 370/389 |
| 6,741,575 B1 | | 5/2004 | Zhang et al. |
| 2002/0163902 A1 | * | 11/2002 | Takao et al. ................. 370/338 |
| 2003/0108069 A1 | | 6/2003 | Yamada |
| 2004/0057387 A1 | | 3/2004 | Yi et al. |
| 2004/0057431 A1 | | 3/2004 | Song et al. |
| 2004/0264462 A1 | | 12/2004 | Bardalai |
| 2005/0021833 A1 | | 1/2005 | Hundscheid et al. |
| 2005/0163273 A1 | * | 7/2005 | Scheffel ...................... 375/354 |

(Continued)

FOREIGN PATENT DOCUMENTS

EP    1511339    3/2005

(Continued)

*Primary Examiner*—Hong Cho
(74) *Attorney, Agent, or Firm*—NSIP Law

(57) ABSTRACT

Provided is a method of generating and managing a connection identifier (CID) for supporting an IPv6 multicast in a wireless network based on IEEE 802.16 and a network interface using the method. Further provided is a network interface included in a node of IPv6-based wireless network, the network interface includes a MAC driver for storing at least one multicast CID and a MAC address of the node which is mapped in the at least one multicast CID, and a control unit for receiving a multicast message which is transmitted from a base station, and transferring the multicast message to an IP layer, when the multicast message includes the multicast CID which is stored in the MAC driver.

27 Claims, 6 Drawing Sheets

U.S. PATENT DOCUMENTS

| | | | |
|---|---|---|---|
| 2007/0072604 A1* | 3/2007 | Wang | 455/428 |
| 2007/0097945 A1* | 5/2007 | Wang et al. | 370/349 |

FOREIGN PATENT DOCUMENTS

| | | |
|---|---|---|
| JP | 2004-166190 | 6/2004 |
| JP | 2004-260317 | 9/2004 |
| JP | 2004-297521 | 10/2004 |
| JP | 2005-073100 | 3/2005 |
| JP | 2005-168006 | 6/2005 |
| KR | 1020050014315 | 2/2005 |
| KR | 1020050015309 | 2/2005 |

* cited by examiner

FIG. 4
MULTICAST CID REQUEST MESSAGE
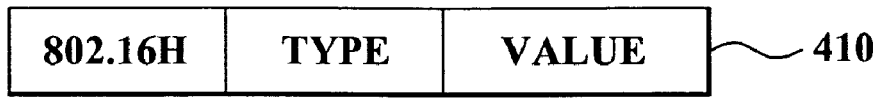
MULTICAST CID RESPONSE MESSAGE
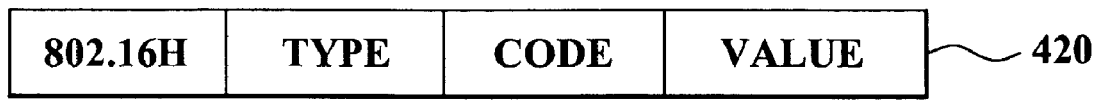

METHOD OF GENERATING AND MANAGING CONNECTION IDENTIFIERS FOR SUPPORTING MULTICAST FOR EACH GROUP IN IPV6-BASED WIRELESS NETWORK AND NETWORK INTERFACE USING THE METHOD

CROSS-REFERENCE TO RELATED APPLICATIONS

This application claims the benefit under 35 U.S.C. §119(e) of U.S. Provisional Application No. 60/732,647, filed on Nov. 3, 2005, in the U.S. Patent and Trademark Office, and under 35 U.S.C. §119(a) of Korean Patent Application No. 10-2006-0052716, filed on Jun. 12, 2006, in the Korean Intellectual Property Office, the entire disclosure of both of which are hereby incorporated by reference.

BACKGROUND OF THE INVENTION

1. Field of the Invention

The present invention relates to an Internet Protocol version 6 (IPv6)-based wireless network. More particularly, the present invention relates to a method of generating and managing connection identifiers (CID) for supporting an IPv6 multicast in a wireless network based on IEEE 802.16 and a network interface using the method.

2. Description of Related Art

There has been a lot of research conducted with respect to broadband wireless access (BWA). BWA is desirable because it can provide broadband communications in a wireless environment. The research has led the Institute of Electrical and Electronics Engineers (IEEE) to create the IEEE 802.16 specification, the entire contents of which are hereby incorporated by reference. The IEEE 802.16 is a broadband wireless access specification. As a result of the creation of the IEEE 802.16, BWA research has been focused on broadband communications using IEEE 802.16. More specifically, IEEE 802.16 is a standard for a wireless air interface used for a wireless metropolitan area network (WMAN).

Also, IPv6 is a next generation Internet protocol that has been developed by the Internet Engineering Task Force (IETF) to overcome the problems of IPv4. IPv4 is version of Internet protocol that is being currently used on the Internet. Both the IPv4 and IPv6 standards are hereby incorporated by reference. In order to apply IPv6 to an IEEE 802.16 wireless network, multicasting for link locals is required when performing neighbor discovery for a plurality of nodes which are located in a particular link. Neighbor discovery is an important process in the operation of IPv6. Nodes use neighbor discovery to determine the link-layer addresses for neighbors known to reside on attached links. A node includes a mobile station and a router which are located in a corresponding link local.

As described above, in IPv6, neighbor discovery has to be performed. Specifically, in order to transmit data to a destination from a mobile station, a base station has to know the link layer address of another node to which the message received from the mobile station will be transmitted. Looking for the link layer address of the other node to which the message will be transmitted is known as neighbor discovery.

In order to perform neighbor discovery in a wireless network environment based on IEEE 802.16, multicast is required to be supported. Also, when a wireless network environment is based on IPv6, a multicast Internet protocol (IP) address for each group and a multicast media access control (MAC) address are required to be generated/mapped for address resolution of the multicast IP address and the MAC address. However, the MAC address is no longer supported in a wireless network environment based on IEEE 802.16. Accordingly, a new system for identifying a node of a MAC layer, for IPv6 neighbor discovery, is needed so that a wireless network based on IEEE 802.16 may support IPv6. A system for identifying a node of a new MAC layer is essential in performing address auto-configuration or duplicate address detection. Address auto-configuration or duplicate address detection is required to be supported by IPv6-based IEEE 802.16 wireless networks.

SUMMARY OF THE INVENTION

Exemplary embodiments of the present invention address at least the above problems and/or disadvantages and to provide at least the advantages described below. Accordingly, an aspect of exemplary embodiments of the present invention is to provide a method of supporting a multicast in an IPv6-based IEEE 802.16 wireless network and a network interface using the method.

Exemplary embodiments of the present invention also provide a method of generating and assigning a multicast CID and a network interface using the method, which applies a method of generating a multicast MAC address in an Ethernet network, for supporting a multicast in an IPv6-based IEEE 802.16 wireless network.

Exemplary embodiments of the present invention also provide a method which may reduce network overhead for neighbor discovery by transmitting an IPv6 multicast for each group only once via a group multicasting CID, and receiving a transmitted packet in each node included in a corresponding link local.

According to an aspect of exemplary embodiments of the present invention, a network interface included in a node of IPv6-based wireless network is provided, the network interface including a media access control (MAC) driver for storing at least one multicast connection identifier (CID) and a MAC address of the node which has been mapped in the multicast CID. Further included is a control unit for receiving a multicast message which has been transmitted from a base station (BS), and transferring the multicast message to an Internet protocol (IP) layer, when the multicast message includes the multicast CID which is stored in the MAC driver.

According to another aspect of exemplary embodiments of the present invention, a network interface included in a BS of an IPv6-based wireless network is provided, the network interface including a CID table for storing at least one multicast CID which is used in a select link local. Further included is a control unit for transmitting the multicast CID to at least one node which is located in the link local.

According to still another aspect of exemplary embodiments of the present invention, a method of assigning a CID in an IPv6-based wireless network is provided, the method including maintaining a table which stores at least one multicast CID. Further included is ascertaining the multicast CID which has been stored in the table. In an exemplary implementation, the multicast CID is generated in a BS which is located in a select link local.

According to another aspect of an exemplary embodiment of the present invention, there is provided a computer readable recording medium storing a computer readable program for executing any of the methods described above.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which:

FIG. 4 is a diagram illustrating an example of request/response message for assigning a multicast CID which is generated in a base station to a link local node according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
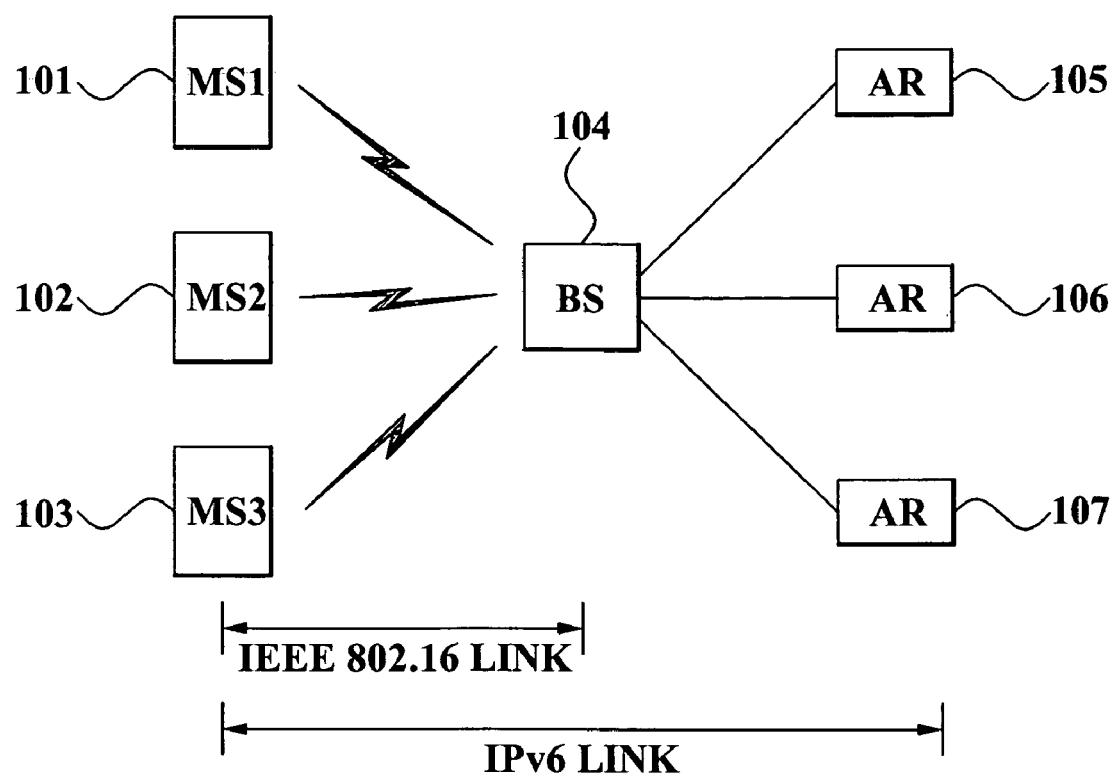
FIG. 1 is a diagram illustrating an example of network configuration based on IEEE 802.16.

FIG. 1 is a diagram illustrating an example of network configuration based on IEEE 802.16. Referring to FIG. 1, mobile stations MS1 101, MS2 102, and MS3 103 are connected to a base station (BS) 104, and may receive a communication service such as call or digital broadcasting. A connection between the mobile stations MS1 101, MS2 102, and MS3 103 and the base station 104 is a connection of MAC peers which are set to transmit/receive control data and user data. There are at least two connections, and CIDs are used to identify the at least two connections. The CIDs are assigned for each connection in the base station 103. In FIG. 1, the mobile stations MS1 101, MS2 102, and MS3 103 are connected to the base station 104 by the IEEE 802.16 link. The mobile stations MS1 101, MS2 102, and MS3 103 are connected to the access routers AR 105, AR 106, and AR 107 by the IPv6 link. Specifically, an IPv6 network includes the mobile stations MS1 101, MS2 102, and MS3 103 and the access routers AR 105, AR 106, and AR 107. In an exemplary implementation, the mobile stations MS1 101, MS2 102, and MS3 103 and the base station 104 use the IEEE 802.16 link.

Figure 2:
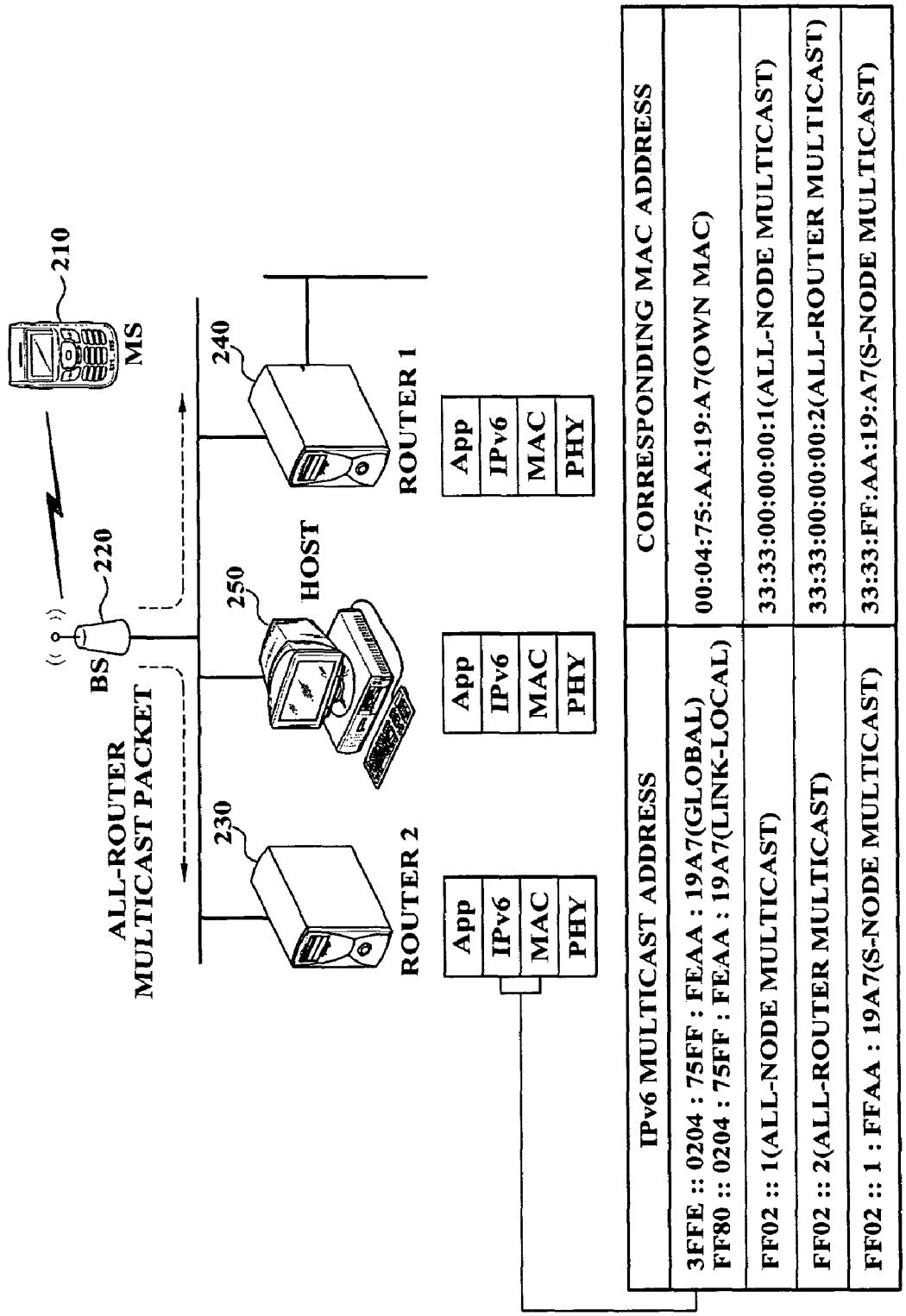
FIG. 2 is a diagram illustrating an example of an Ethernet connection supporting IPv6 which has been proposed in Requests For Comments (RFC)-2464.

FIG. 2 is a diagram illustrating an example of an Ethernet connection supporting IPv6 which has been proposed in Requests For Comments (RFC)-2464, the entire disclosure of which is hereby incorporated by reference.

A method of generating a multicast MAC address in an Ethernet environment supporting IPv6 is proposed in the RFC-2464. Referring to FIG. 2, a base station (BS) 220, a router (router 1) 240, a router (router 2) 230, and a host 250 are connected via Ethernet protocol. The router 240, the router 230, and the host 250 include a protocol specification according to the Open Systems Interconnection 7 (OSI 7) layer model. Specifically, the router 240, the router 230, and the host 250 include a physical layer protocol (PHY), a data link layer (MAC), a network layer (IPv6), and an upper application layer (App). The MAC and IPv6 may include an address system as shown in FIG. 2 in order to support an IPv6 multicast.

According to the IPv6, every node includes a global IP address, for example, 3FFE::0204:75FF:FEAA:19A7, and a link local IP address, for example, FE80::0204:75FF:FEAA:19A7. In an exemplary implementation, the link local IP address includes an all-nodes multicast IP address, for example, FF02::1, an all-routers multicast IP address, for example, FF02::2, and a solicited-node multicast IP address, for example, FF02::1:FFAA:19A7. A MAC address of each node is required to be generated/mapped by corresponding to the IP addresses described above in order to support the IPv6 multicast. Referring to FIG. 2, an example of the MAC address corresponding to the IP addresses is illustrated in detail. According to RFC-2464, a link local multicast MAC address includes the first two octets of '3333', and the other four octets of the link local multicast MAC address are different, respectively. Particularly, the solicited-node multicast MAC address includes '3333' and a portion of an actual MAC address of a corresponding node. As described above, the method of generating a multicast MAC address in an Ethernet environment supporting IPv6, which has been proposed in RFC-2464, may be applied to a multicast method for each group of an IPv6-based IEEE 802.16 wireless network.

Figure 3:
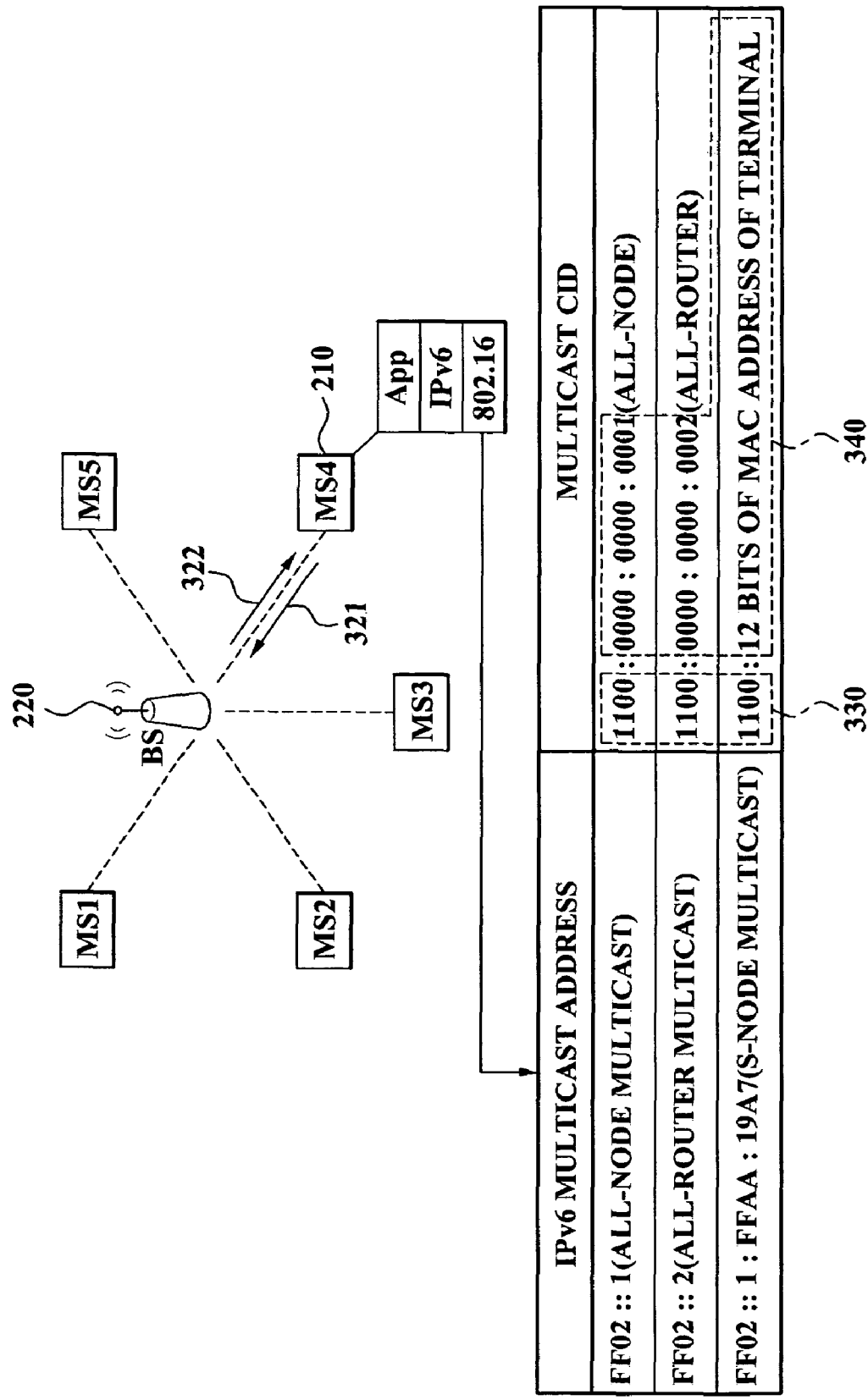
FIG. 3 is a diagram illustrating an example of an IPv6-based wireless network using a multicast CID according to an exemplary embodiment of the present invention.

FIG. 3 is a diagram illustrating an example of IPv6-based wireless network using a multicast CID according to an exemplary embodiment of the present invention.

The IPv6-based wireless network includes a BS 220, a plurality of nodes 210. In an exemplary implementation, the plurality of nodes 210 include a plurality of mobile stations including MS1, MS2, MS3, MS4, and MS5. Also, the mobile stations are connected to the BS 220 and receive a wireless communication service. As described in FIG. 2, the node 210 includes a protocol specification according to the OSI 7 layer model, the entire disclosure of which is hereby incorporated by reference. Also, the node 210 includes a physical layer protocol (PHY), a 802.16 layer which defines a data link layer (MAC), an IPv6-based network layer (IPv6), and an upper application layer (App). In order to support a multicast for each group in link locals in the IPv6-based IEEE 802.16 wireless network, a MAC address of each node is required to be generated/mapped. However, communication using the MAC address is not performed in the IEEE 802.16 wireless network. Accordingly, an identifying system of a node of a new MAC layer is required to replace the MAC address. A CID which is used in the IEEE 802.16 wireless network may be utilized as the identifying system. The CID divides connections among the plurality of nodes 210 including the mobile stations or routers. In an exemplary implementation, the CID may be divided into an initial ranging CID, a basic CID, a primary management CID, a secondary management CID, a transport CID, a multicast polling CID, a padding CID, and a broadcast CID. To support a multicast for each group using the CID, embodiments as described below may be used.

Embodiment 1

Distributed Way

Similar to RFC-2464 described with FIG. 2, the group multicasting CID, which is known by the BS 220 and all nodes 210, may be selected. In an exemplary implementation, the group multicasting CID is a 16 bit string. A protocol data unit (PDU), which is transmitted between the BS 220 and the nodes 210, including the selected group multicasting CID, may be transmitted. Accordingly, all nodes included in a corresponding link local may verify whether a corresponding message is a multicast message, or which group the multicast message is included in.

The CID may be a randomly selecting a 16-bit string generated by CID generation logic. The CID generation logic divides the CID into a prefix 330 and a postfix 340 of 16-k bits. In an exemplary implementation, the prefix 330 has a select size, that is k bits. Also, the prefix 330 includes select bits, similar to the use of '3333' in RFC-2464. In FIG. 3, 4 bits of '1100' are used as the prefix 330. In an exemplary implementation, the prefix 330 '1100' indicates that a corresponding CID is a multicast CID. The division of the CID for each group is performed by using 16-k bits, that is a 12-bit postfix 340. Specifically, the all-nodes multicast CID may use '0000: 0000:0001' as the 12-bit postfix 340. The all-routers multicast CD may use '0000:0000:0002' as the 12-bit postfix 340. The solicited-node multicast CD may use one portion of the MAC address as the 12-bit postfix 340. In an exemplary implementation, when the prefix 330 is determined, the solicited-node multicast CID may be embodied to be automatically generated in the nodes 210. The CD generation logic is disclosed in Korean Patent Unexamined Publication No. 2005-15309 which has been filed by the applicant of the present invention, which is entitled "An apparatus and method for assigning connection identifier in broadband wireless access communication system", the entire disclosure of which is hereby incorporated by reference.

Embodiment 2

Central Management Way

In order to generate and assign the group multicasting CID according to an exemplary embodiment of the present invention, as described in Embodiment 1, the multicast CID which is known by all nodes may be used. Also, generating the multicast CID in the BS 220, transmitting the multicast CID to each of the nodes 210, and assigning the multicast CD to each of the nodes 210 may be performed. The multicast CID generated in the BS 220 may be transmitted to each of the nodes 210 in the form of message 322. In an exemplary implementation, the message may be transmitted between the BS 220 and the nodes 210 which are defined in IEEE 802.16. Also, the multicast CID may be transmitted to each of the nodes 210 via a signaling message for each wireless network provider. A method of transmitting the multicast CID to each of the nodes in the form of message will be described in detail by referring to FIG. 4.

FIG. 4 is a diagram illustrating an example of request/response messages for assigning a multicast CID which is generated in a BS to a link local node according to an exemplary embodiment of the present invention. FIG. 4 illustrates an example of a multicast CID request message 410 and a multicast CID response message 420. In an exemplary implementation, the multicast CID request message 410 requests a multicast CID from nodes 210 to a BS 220 via path 321. Also, the multicast CD response message 420 is for assigning the multicast CID in response to the request from nodes 210 to the BS 220 via path 322. Values of each field of the multicast CID request message 410 and the multicast CID response message 420 are shown below.

TABLE 1

| Type | Code | Value |
|---|---|---|
| 1 (Request) | | MAC address |
| 2 (Response) | 1 | All-nodes multicast CID |
| | 2 | All-routers multicast CID |
| | 3 | Solicited-node multicast CID |

As shown in Table 1, the multicast CD request message 410 includes '1'. In an exemplary implementation, the '1' has a meaning of 'Request' as type information of a corresponding message. Also, the '1' includes a MAC address of a corresponding node 210 as value information. Also, the multicast CD response message 420 includes '2'. In an exemplary implementation, the '2' has a meaning of 'Response' as type information of a corresponding message. Also, the '2' includes an all-nodes multicast CID with respect to a code 1, an all-routers multicast CID with respect to a code 2, and a solicited-node multicast CID with respect to a code 3, as value information. In an exemplary implementation, the code indicates information for each group. As described above, when a prefix 330 is transmitted from the BS 220, the solicited-node multicast CID may be embodied to be automatically generated.

However, the multicast CID request message 410 and the multicast CID response message 420 have been described as an example for convenience of description. A format of the message and values for each field may be varied.

Figure 5:
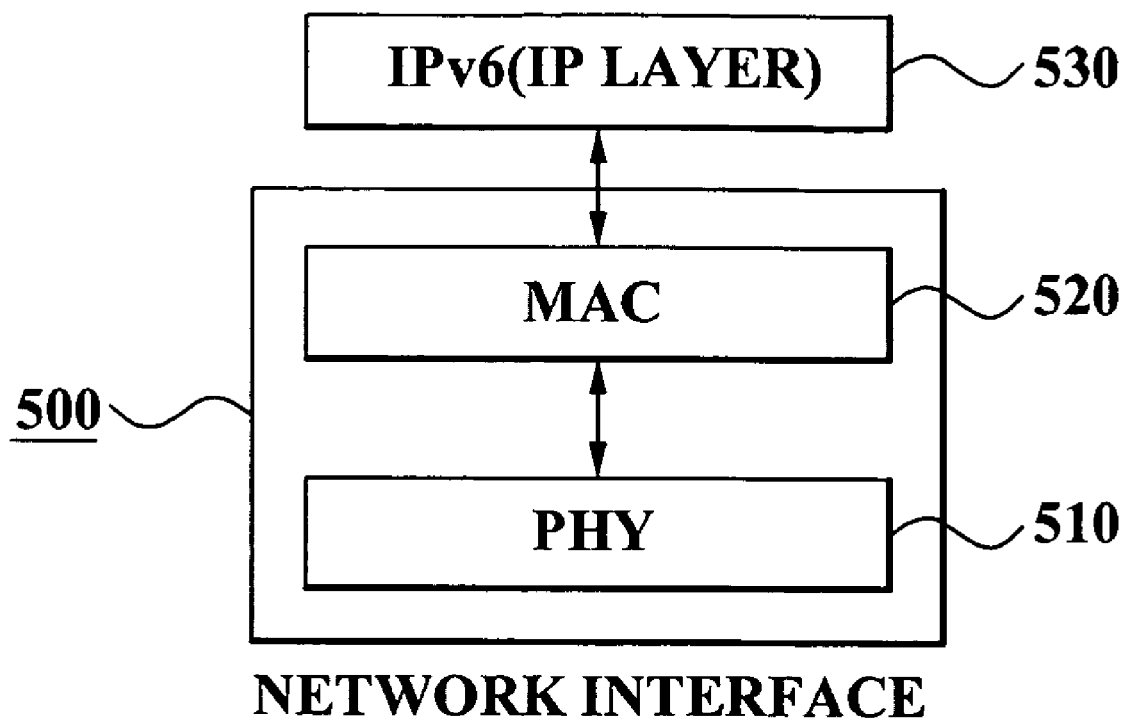
FIG. 5 is a block diagram illustrating a network interface according to another exemplary embodiment of the present invention.

FIG. 5 is a block diagram illustrating a network interface according to another exemplary embodiment of the present invention. Referring to FIG. 5, the network interface 500 according to an exemplary embodiment of the present invention includes a PHY 510 and a MAC 520. The network interface 500 based on a general network interface configuration is illustrated in FIG. 5. However, another network interface which is implemented by including a network layer is not excluded. Specifically, the network interface including IPv6 530 which is an element of the network layer may be embodied. The network interface 500 illustrated in FIG. 5 may be embodied as the network interface managing a PHY layer and MAC layer of a mobile station, a network interface managing the PHY layer and MAC layer of a router, and a network interface managing the PHY layer and MAC layer of the BS, respectively. The method of generating, assigning, and mapping a multicast CID, which is described by referring to FIGS. 3 and 4, may be embodied as hardware or software in the network interface 500 illustrated in FIG. 5. Hereinafter, an example of the network interface 500 included in the nodes and the network interface 500 included in the BS will be described by referring to FIG. 5.

According to an exemplary embodiment of the present invention, the network interface 500 included in the nodes of an IPv6-based wireless network includes a PHY 510 which manages a physical layer of a wireless network, and a MAC 520. In an exemplary implementation, the MAC 520 includes a MAC driver storing at least one multicast CID and a MAC address of the nodes which are mapped to the multicast CID.

Also, the MAC includes a control unit receiving a multicast message which is transmitted from the BS, and transferring the multicast message to an IP(network) layer 530, when the multicast message includes the multicast CID which is stored in the MAC driver. The control unit may transmit a PDU including the multicast CID in a CID field, when the PDU including multicast IP addresses is transferred from the IP layer. The MAC driver and the control unit are not shown. As described above, the nodes may be a mobile station or a router.

Also, according to an exemplary embodiment of the present invention, the network interface 500 included in the BS of IPv6-based wireless network includes the PHY 510 which manages the PHY layer of the wireless network, and the MAC 520. In an exemplary implementation, the MAC 520 includes a CID table storing at least one multicast CID which is used in a select link local, and a control unit transmitting the multicast CID to at least one node which is located in the link local. The CID table and the control unit are not shown.

A configuration element of the PHY 510 and the MAC 520 described above has been described as a functional module for performing the method of generating, assigning, and mapping a multicast CID. However, a name change or segmentation/mergence of the functional module falls within the scope of the exemplary embodiments of the present invention.

Figure 6:
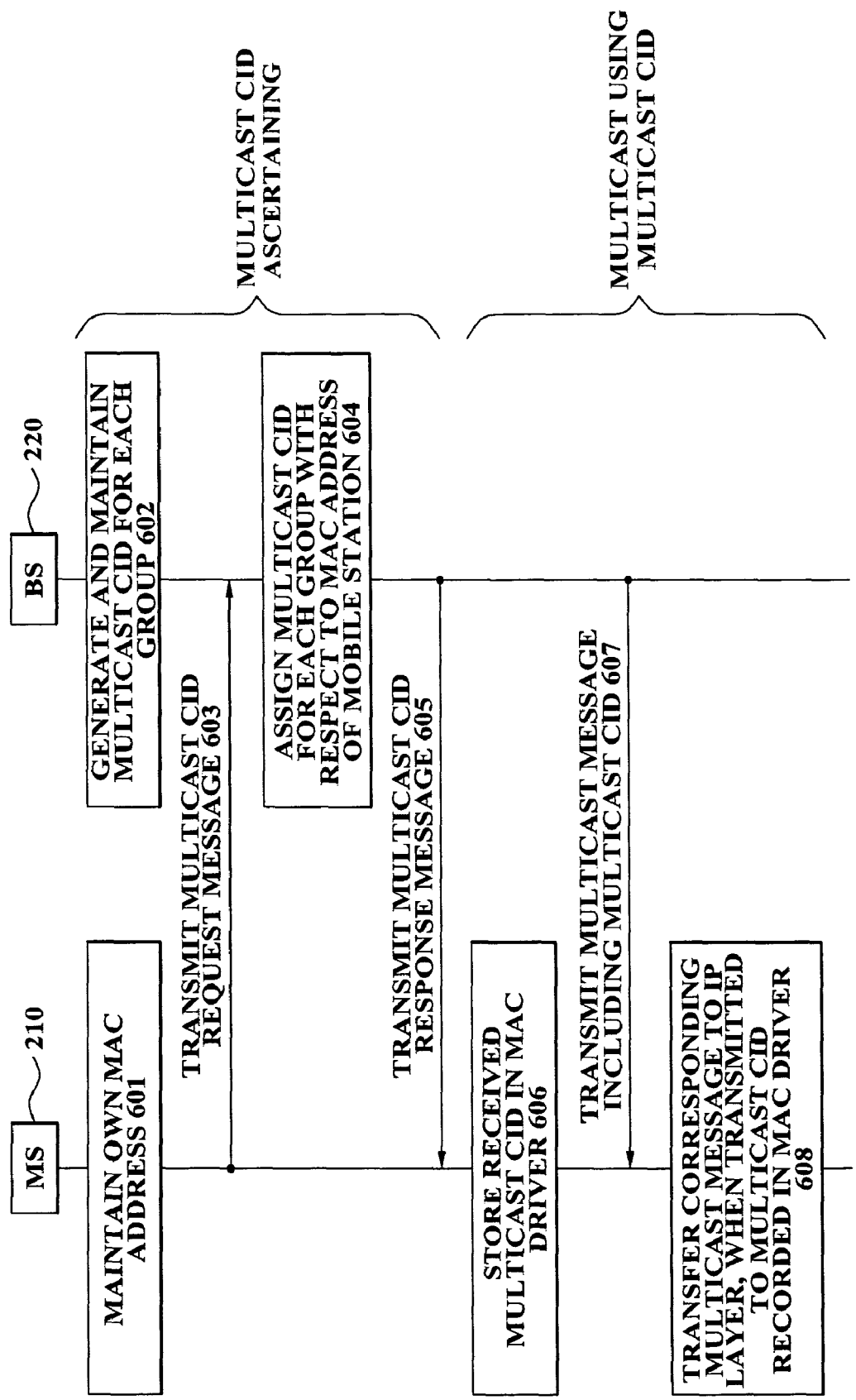
FIG. 6 is a flowchart illustrating an example of a method of assigning a multicast CID in an IPv6-based wireless network according to still another exemplary embodiment of the present invention.

FIG. 6 is a flowchart illustrating an example of a method of assigning a multicast CID in an IPv6-based wireless network according to still another exemplary embodiment of the present invention. FIG. 6 illustrates Embodiment 2 which was discussed above.

Referring to FIG. 6, the method of assigning the multicast CID in the IPv6-based wireless network according to still another exemplary embodiment of the present invention may be divided into two operations.

Multicast CID Ascertaining Operation

In operation 601, each node 210 including mobile stations maintains its own MAC address. Also, in operation 602, a BS 220 maintains a group multicasting CID generated in a select CID table. In operation 603, when the multicast CID is required, for example, when the nodes 210 power on or enter a new link local, a multicast CID request message is transmitted to the BS 220. The multicast CID request message will not be described further since the multicast CID request message has been described above with respect to FIG. 4. In operation 604, the BS 220 which receives the multicast CID request message assigns the group multicasting CID with respect to a MAC address of the nodes 210. In operation 605, the assigned group multicasting CID is included in the multicast CID response message, and is transmitted to the nodes 210. In operation 606, the node 210 which receives the multicast CD request message stores the group multicasting CID included in a corresponding message in a MAC layer element such as its own MAC driver. Through operations 601, 602, 603, 604, 605, and 606, the nodes 210 may ascertain the group multicasting CID of a corresponding link local.

Operation of Multicast Using Multicast CID

In operation 607, the nodes 210 which ascertain the group multicasting CID through operations described above receives a multicast message which is transmitted from the BS 220. In an exemplary implementation, the nodes 210 determine whether a corresponding multicast message is a multicast, or which group the multicast is included in, based on the multicast CID included in a corresponding multicast message. In operation 608, the nodes 210 refer to the group multicasting CID which is stored in the MAC driver of the network interface. Then, when the multicast CID included in the multicast message exists, the nodes 210 transfers the corresponding multicast message to a network layer and perform operations according to the corresponding multicast message.

As an example, the use of an IEEE 802.16 link has been described. However, the exemplary embodiment of the present invention may be applied to network technology for supporting IPv6 in other wireless networks in addition to IEEE 802.16.

According to an aspect of exemplary embodiments of the present invention, a method of supporting a multicast for each group in an IPv6-based wireless network according to IEEE 802.16 and a network interface using the method may be provided.

Also, according to an aspect of exemplary embodiments of the present invention, a method of generating and assigning multicast CID, which applies a method of generating a multicast MAC address in an Ethernet network, and a network interface using the method, may be provided for supporting a multicast in an IPv6-based IEEE 802.16 wireless network.

Also, according to an aspect of exemplary embodiments of the present invention, a method which may reduce network overhead for neighbor discovery by transmitting an IPv6 multicast once for each group via a multicast CID, and receiving a transmitted packet in each node included in a corresponding link local may be provided.

Also, exemplary embodiments the present invention can be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A network interface included in a node of an Internet Protocol version 6 (Ipv6)-based wireless network, the network interface comprising:

a media access control (MAC) driver for storing at least one multicast connection identifier (CID) and a MAC address of the node which is mapped in the multicast CID; and a control unit for receiving a multicast message which is transmitted from a base station (BS), and transferring the multicast message to an Internet Protocol (IP) layer, when the multicast message includes the multicast CID which is stored in the MAC driver, wherein the multicast CID is generated for enabling the multicast message to be multicast over at least any one of all-routers, all-nodes, or solicited-nodes, the multicast CID comprises an N bit prefix and a 16-n bit postfix, and each of the all-routers multicast CID, the all-nodes multicast CID, and the solicited-nodes multicast CID have an identical prefix.

2. The network interface of claim 1, wherein the control unit transmits a protocol data unit (PDU) including the multicast CID in a CID field, when the PDU including multicast IP addresses is transferred from the IP layer.

3. The network interface of claim 1, wherein the multicast CID is known to link locals in the BS.

4. The network interface of claim 3, wherein the multicast CID is a random 16 bit string.

5. The network interface of claim 1, wherein a postfix of the solicited-node multicast CID is at least one portion of a MAC address of the node.

6. The network interface of claim 1, wherein the all-routers multicast CID and the all-nodes multicast CID are generated in the BS.

7. The network interface of claim 6, wherein the multicast CID is a random 16 bit string.

8. The network interface of claim 6, wherein the node transmits/receives a message according to IEEE 802.16 or a signaling message with the BS, and the multicast CID is assigned to the node.

9. The network interface of claim 8, wherein:
the message comprises a request message requesting the multicast CID and a response message to the request message, wherein the request message comprises type information and a MAC address of the node, and the response message comprises type information and the multicast CID assigned to the node.

10. The network interface of claim 1, wherein the wireless network is an IEEE 802.16 network.

11. The network interface of claim 1, wherein the node is a mobile station or a router.

12. A network interface included in a BS of an IPv6-based wireless network, the network interface comprising:
a CD table for storing at least one multicast CID which is used in a select link local; and
a control unit for transmitting the multicast CID to at least one node which is located in the link local,
wherein the multicast CID is generated for enabling the multicast message to be multicast over at least any one of all-routers, all-nodes, or solicited-nodes, the multicast CID comprises an N bit prefix and a 16-n bit postfix, and each of the all-routers multicast CID, the all-nodes multicast CID, and the solicited-nodes multicast CID have an identical prefix.

13. The network interface of claim 12, wherein the control unit generates and stores the all-routers multicast CID and the all-nodes multicast CID in the CID table.

14. The network interface of claim 13, wherein the multicast CID is a random 16 bit string.

15. The network interface of claim 13, wherein the control unit transmits/receives a message according to IEEE 802.16 or a signaling message with the node, and assigns the multicast CID.

16. The network interface of claim 15, wherein:
the message comprises a request message requesting the multicast CID and a response message to the request message, wherein the request message comprises type information and a MAC address of the node, and the response message comprises type information and the multicast CIDs which are assigned to the node.

17. The network interface of claim 12, wherein a postfix of the solicited-node multicast CID is at least one portion of a MAC address of the node.

18. The network interface of claim 12, wherein the wireless network is an IEEE 802.16 network.

19. The network interface of claim 12, wherein the node is a mobile station or a router.

20. A method of assigning a CID in an IPv6-based wireless network, the method comprising:
maintaining a table which stores at least one multicast CID; and
ascertaining the multicast CID which is stored in the table,
wherein the multicast CID is known to a node and a BS which are located in a select link local and generated for enabling the multicast message to be multicast over at least any one of all-routers, all-nodes, or solicited-nodes, the multicast CID comprises an N bit prefix and a 16-n bit postfix, and each of the all-routers multicast CID, the all-nodes multicast CID, and the solicited-nodes multicast CID have an identical prefix.

21. The method of claim 20, wherein the wireless network is an IEEE 802.16 network.

22. The method of claim 20, wherein the node is a mobile station or a router.

23. A method of assigning a CID in an IPv6-based wireless network, the method comprising:
maintaining a table which stores at least one multicast CID; and
ascertaining the multicast CID which is stored in the table;
wherein the multicast CID is generated in a BS which is located in a select link local and generated for enabling the multicast message to be multicast over at least any one of all-routers, all nodes, or solicited-nodes, the multicast CID comprises an N bit prefix and a 16-n bit postfix, and each of the all-routers multicast CID, the all-nodes multicast CID, and the solicited-nodes multicast CID have an identical prefix.

24. The method of claim 23, wherein the multicast CID is a random 16 bit string.

25. The method of claim 23, wherein a postfix of the solicited-node multicast CID is at least one portion of a MAC address of the node.

26. The method of claim 23, wherein the multicast CID transmits/receives a message according to IEEE 802.16 or a signaling message with the BS, and is assigned to the node.

27. The method of claim 26, wherein:
the message comprises a request message requesting the multicast CID and a response message to the request message, wherein the request message comprises type information and a MAC address of the node, and the response message comprises type information and the multicast CID assigned to the node.

* * * * *